United States Patent
Obelink et al.

(10) Patent No.: US 12,215,775 B2
(45) Date of Patent: Feb. 4, 2025

(54) SHAFT ASSEMBLY FOR USE IN A DUAL CLUTCH TRANSMISSION SYSTEM FOR IMPROVED LUBRICATION AND OTHER IMPROVED PARTS OF TRANSMISSION SYSTEMS

(71) Applicant: PUNCH POWERTRAIN PSA E-TRANSMISSIONS N.V., Sint-Truiden (BE)

(72) Inventors: Rens Obelink, Sint-Truiden (BE); Bert Johannes Cornelis Van Bakel, Sint-Truiden (BE); Mohammad Galab, Sint-Truiden (BE); Roy Bastiaansen, Sint-Truiden (BE); Vilmar Gomes Pereira, Sint-Truiden (BE)

(73) Assignee: PUNCH POWERTRAIN PSA E-TRANSMISSIONS N.V., Sint-Truiden (BE)

( * ) Notice: Subject to any disclaimer, the term of this patent is extended or adjusted under 35 U.S.C. 154(b) by 0 days.

(21) Appl. No.: 18/018,258

(22) PCT Filed: Jul. 20, 2021

(86) PCT No.: PCT/EP2021/070225
§ 371 (c)(1),
(2) Date: Jan. 26, 2023

(87) PCT Pub. No.: WO2022/023115
PCT Pub. Date: Feb. 3, 2022

(65) Prior Publication Data
US 2023/0287974 A1    Sep. 14, 2023

(30) Foreign Application Priority Data
Jul. 28, 2020   (NL) ..................... 2026152

(51) Int. Cl.
*F16H 57/04*   (2010.01)
*F16D 13/64*   (2006.01)
(Continued)

(52) U.S. Cl.
CPC ....... *F16H 57/0426* (2013.01); *F16D 13/648* (2013.01); *F16D 25/0638* (2013.01);
(Continued)

(58) Field of Classification Search
CPC .. F16D 13/648; F16D 25/0638; F16D 25/082; F16D 25/10; F16D 21/06;
(Continued)

(56) References Cited

U.S. PATENT DOCUMENTS

| | | |
|---|---|---|
| 3,165,946 A | 1/1965 | Wayman |
| 4,501,167 A | 2/1985 | Saito |

(Continued)

FOREIGN PATENT DOCUMENTS

| | | | | |
|---|---|---|---|---|
| CN | 103161892 B | * | 1/2016 | ............... F16H 3/66 |
| DE | 102013006429 A1 | * | 10/2014 | ............. B60K 6/387 |

(Continued)

OTHER PUBLICATIONS

The International Search Report and Written Opinion dated Oct. 5, 2021, for Application No. PCT/EP2021/070225 (21 pages).

*Primary Examiner* — Tinh Dang
(74) *Attorney, Agent, or Firm* — KDW Firm PLLC

(57) ABSTRACT

A shaft assembly for a dual clutch transmission system to be installed in a power train of a motor vehicle for selectively coupling three rotating transmission members. The shaft assembly extends along a central axis and includes a transmission member having first and second axial ends relative to the central axis. The first axial end is rotatably connected to a shaft part, and a bore extends along the central axis from the first axial end in a direction towards the second end. The (Continued)

bore is open at the first end and includes a closed bore end opposite the first axial end. The bore includes a stepped closed bore end section in which a diameter of the bore decreases stepwise towards the closed bore end. Improved clutch assemblies, annular drive plates for a clutch assembly and method of manufacturing thereof, dual-clutch assemblies, and clutch subassemblies for assembly into a transmission system.

17 Claims, 11 Drawing Sheets

(51) Int. Cl.
  *F16D 25/0638* (2006.01)
  *F16D 25/08* (2006.01)
  *F16D 25/10* (2006.01)
  *F16H 3/00* (2006.01)
  *F16H 61/00* (2006.01)
(52) U.S. Cl.
  CPC ........... *F16D 25/082* (2013.01); *F16D 25/10* (2013.01); *F16H 2061/0046* (2013.01)

(58) Field of Classification Search
  CPC ............. F16D 33/02; F16H 2061/0046; F16H 57/0426; F16H 57/043
  See application file for complete search history.

(56) References Cited

U.S. PATENT DOCUMENTS

| | | | |
|---|---|---|---|
| 7,174,996 B2 * | 2/2007 | Hori .................... | F16H 61/0009 184/6.12 |
| 10,927,937 B2 * | 2/2021 | Downs .................... | F16D 25/12 |
| 2009/0247343 A1 * | 10/2009 | Hart .................... | F16H 61/0009 475/276 |
| 2017/0146110 A1 | 5/2017 | Galab | |

FOREIGN PATENT DOCUMENTS

| | | | | |
|---|---|---|---|---|
| EP | 1906056 A1 | | 4/2008 | |
| EP | 2068029 A1 * | | 6/2009 | ............. F16D 21/06 |
| EP | 2236849 A1 | | 10/2010 | |
| JP | H11287252 A | | 10/1999 | |

* cited by examiner

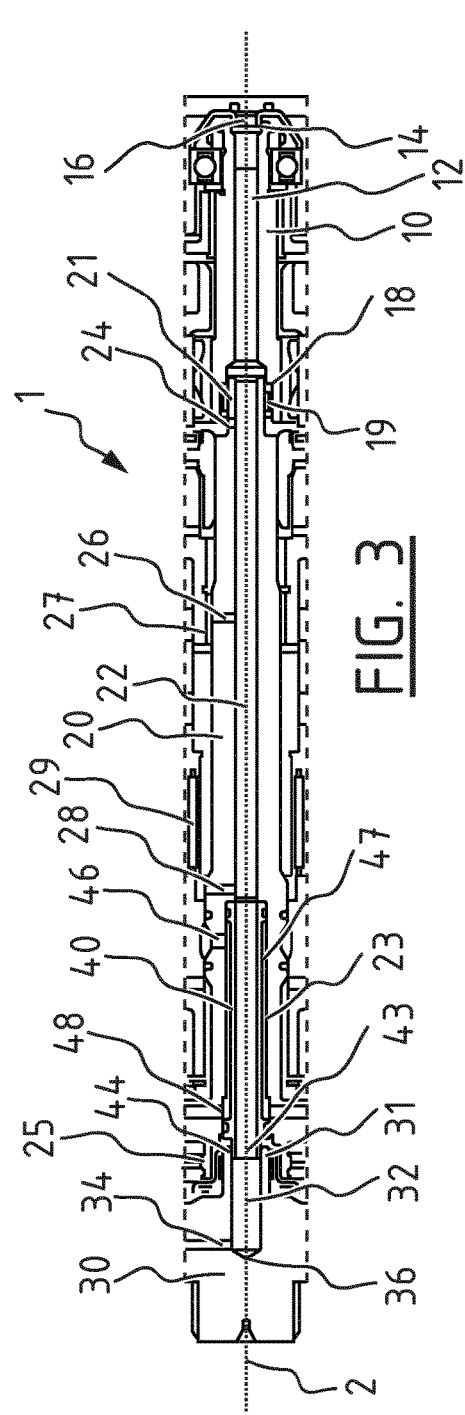

SHAFT ASSEMBLY FOR USE IN A DUAL CLUTCH TRANSMISSION SYSTEM FOR IMPROVED LUBRICATION AND OTHER IMPROVED PARTS OF TRANSMISSION SYSTEMS

This application is a national stage filing under 35 U.S.C. 371 of pending International Application No. PCT/EP2021/070225, filed Jul. 20, 2021, which claims priority to Netherlands Patent Application No. 2026152, filed Jul. 28, 2020, the entirety of which applications are incorporated by reference herein.

The present patent disclosure relates to a shaft assembly for use in a dual clutch transmission system to be installed in a power train of a motor vehicle for selectively coupling three rotating transmission members, the dual clutch transmission system and the motor vehicle. The present patent disclosure also relates to a clutch assembly, an annular drive plate for a clutch assembly and method of manufacturing thereof, a dual-clutch assembly, and a clutch subassembly for assembly into a transmission system.

A conventional dual clutch transmission system to be installed in a power train of a motor vehicle for selectively coupling rotating transmission members typically comprises a shaft assembly arranged along a central axis, wherein parallel bores extend along at least a part of the central axis for providing separate lubrication and actuation channels. Machining of these parts with multiple channels is complicated and thereby expensive. In addition, the presence of parallel bores/channels reduces the strength of the shaft assembly.

Lubrication channels in shaft assemblies generally comprise several openings along the channel length for supplying lubricant to various sections and parts of the respective transmission system. The control of how much lubricant enters these various openings is challenging, because too much of the lubricant exits the openings closer to the end of the channel and/or too little lubricant exits the openings closer to the beginning of the channel, closer to the lubricant inlet.

It is an object, among other objects, of the present patent disclosure to provide a shaft assembly with improved distribution of lubricant. It is also an object, among other objects, to provide a shaft assembly with lubricant channels with improved strength and less complex machining.

According to a first aspect, there is provided a shaft assembly for use in a dual clutch transmission system to be installed in a power train of a motor vehicle for selectively coupling three rotating transmission members, wherein the shaft assembly extends along a central axis and comprises:
  a transmission member comprising
    a first axial end and a second axial end relative to the central axis, wherein the first axial end is configured to be rotatably connected to a shaft part,
    a bore extending along the central axis from the first axial end in a direction towards the second end, wherein the bore is open at the first axial end and comprises a closed bore end opposite the first axial end, wherein the bore comprises a stepped closed bore end section in which a diameter of the bore decreases stepwise towards the closed bore end.

Due to the presence of the stepped closed bore, compared to a normal (not stepped) bore end, the flow at the opposite end of the lubricant channel is increased, while the flow at the end of the bore is decreased. This is especially the case when the parts of the shaft assembly such as the transmission member are rotating. The presence of the step in effect creates back pressure and a "pump effect" which increases the flow at the lubricant outlet openings closer to the beginning of the channel. The lubricant flow may, at some rotational speeds, even be increased by as much as about 60% in some openings compared to a lubrication channel with a normal (un-stepped) bore end. The lubricant may for instance be used for one or more planetary gear sets and or bearing means such as needle roller bearings present in the transmission system.

In an embodiment, the bore has a first diameter adjacent to the stepped closed bore end section, wherein the stepped closed bore end comprises a first diameter decreasing section in which the bore diameter decreases from the first diameter to a second intermediate diameter and a second diameter decreasing section in which the diameter of the bore decreases from the second intermediate diameter towards zero at the closed bore end. Beneficially, this geometry allows for efficient machining of the bore and bore end. The first diameter decreasing section may be slanted in the direction of the central axis. This still provides the beneficial effects but is more practical to machine. Also such a slanted shape is referred to as "stepped" or "stepwise" or a "step" in the present patent disclosure.

Preferably, the stepped closed bore end comprises a constant diameter section having the second intermediate diameter and positioned between the first diameter decreasing section and the second diameter decreasing section.

In an embodiment, a ratio between the second intermediate diameter and the first diameter is in the range of 0.3 to 0.9, preferably in the range of 0.4 to 0.8, most preferably in the range of 0.51 to 0.78. In these ranges, the effect of increasing flow in the openings located more in the beginning of the channel (opposite the bore end) have increased flow, while the openings located more closely to the bore end have reduced flow. The preferred and most preferred ranges provide respectively better and even better increased and decreased flow rates for openings resp. closer to the beginning of the channel and closer to the end of the channel at the bore end.

In an embodiment, the transmission member comprises a lubricant outlet opening for allowing a lubricant fluid flow entering the transmission member at the first axial end to exit the bore, wherein the lubricant outlet opening is positioned along the bore between the first axial end and the stepped closed bore end and extends from the bore towards an outer surface of the transmission member in order to, in use, provide lubricant to at least a part of the dual clutch transmission system.

In another embodiment the bore of the transmission member is a first bore, and the shaft assembly further comprises:
  the shaft part comprising a second bore extending along the central axis from a first axial end of the shaft part to a second axial end of the shaft part, wherein the bore comprises a main section and an insert receiving section at the first axial end of the shaft part adjacent to the main section, wherein the shaft part is rotatably connected at the insert receiving section to the transmission member at the first axial end of the transmission member; and
  a hollow tube shaped insert placed in the bore at the insert receiving section, wherein a first channel extends along the central axis through the bore and an inside of the hollow tube, wherein an outer diameter of the hollow tube shaped insert is smaller than an inner diameter of the bore at the insert receiving section such that a second channel is arranged between an outer side of the hollow tube and an outer circumference of the bore at the insert receiving section and concentrically relative to the first channel, wherein the first channel and the second channel are separated from each other.

In this configuration, the hollow tube shaped insert end may be used as an opening for lubricant flow, wherein the flow rate is also controlled by the presence of the stepped bore end. The hollow tube shaped insert also or alternatively provides for a separation of two channels, the second channel being concentrically arranged with respect to the first channel. In this way, only the first channel/second bore has to be made by machining of the shaft part, while the other is provided by the presence of the insert. The second channel can be used for providing a path for actuation fluid to flow to various parts of the transmission system, such as piston chambers for actuating clutches.

In an embodiment, the hollow tube shaped insert comprises a first end section extension extending from the first end of the shaft part and into at least a part of the first bore, wherein an outer diameter of the first end section extension is such that a lubricant flow path is formed between an outer side of the first end section extension and the part of the first bore into which the first end section extension extends such that in use lubricant flows from the first bore through the flow path to lubricate at least a part of the dual clutch transmission system.

It will be understood that the transmission member can be an aspect by itself, separate from the shaft assembly. The transmission member may be a connect shaft for connecting the transmission system to the internal combustion engine.

In accordance with a second aspect, there is provided a shaft assembly for use in a dual clutch transmission system to be installed in a power train of a motor vehicle for selectively coupling three rotating transmission members and extending along a central axis, the shaft assembly comprising:
 a shaft part comprising a bore extending along the central axis from a first axial end of the shaft part to a second axial end of the shaft part, wherein the bore comprises a main section and an insert receiving section at the first axial end of the shaft part adjacent to the main section; and
 a hollow tube shaped insert placed in the bore at the insert receiving section, wherein a first channel extends through the bore and an inside of the hollow tube, wherein an outer diameter of the hollow tube shaped insert is smaller than an inner diameter of the bore at the insert receiving section such that a second channel is arranged between the hollow tube and the shaft part and concentrically relative to the first channel.

The hollow tube shaped insert beneficially provides for a separation of two channels, the second channel being concentrically arranged with respect to the first channel. In this way, only the first channel/second bore has to be made by machining of the shaft part, while the other is provided by the presence of the insert, thus reducing the complexity of the machining. In addition, the strength of the shaft part is increased compared to a shaft part with two parallel channels. The second channel can be used for providing a path for actuation fluid to flow to various parts of the transmission system, such as piston chambers for actuating clutches. In general, in the present patent disclosure, actuation fluid and lubrication fluid are both oil. Any mention herein of "lubricant" and "actuation fluid" or the like can thus be exchanged with "oil" herein. Likewise, "lubrication channel" and "actuation fluid channel" or the like can be exchanged with "oil channel".

In an embodiment, the hollow tube shaped insert comprises a first end section extension extending from the first end of the shaft part and configured to extend into at least a part of a bore of one of the transmission members arranged along the central axis and configured to be rotatably attached to the shaft part at the first end thereof, wherein an outer diameter of the first end section extension is such that, in use, a lubricant flow path is formed between an outer side of the first end section extension and the part of the bore of one of the transmission members into which the first end section extension is configured to extend.

Beneficially, there is no need for a dedicated opening (bore) through any of the parts to create another oil channel. Additionally, the seal between the first end section extension and the bore of the transmission member does not have to close very tightly, since the leakage is used to intentionally provide oil.

In an embodiment of any of the above described aspects, the shaft part comprises an actuation fluid inlet and an actuation fluid outlet in the insert receiving section such that the second channel represents an actuation fluid channel, wherein preferably, in use, the actuation fluid inlet and actuation fluid outlet are aligned with respective actuation fluid channels of the dual clutch transmission system such that the actuation fluid is used for selectively coupling at least one of the transmission members of the dual clutch transmission system.

In an embodiment of any of the above described aspects, the main section of the bore has a first diameter and the insert receiving section has a second diameter, wherein the second diameter is larger than the first diameter, wherein preferably an inner diameter of the hollow tube is equal, or substantially equal, to the first diameter of the bore. In this way, the channel formed by the bore of the shaft part and the inside of the tube shaped insert is continuous and of constant diameter.

In an embodiment of any of the above described aspects, the hollow tube shaped insert comprises a first sealing member and a second sealing member at an outer side of the hollow tube shaped insert for separating the second channel that is formed between the first and second sealing members is separated from the first channel. The sealing members may be O-rings. The O-rings may be held between respective protrusions along the outer circumference of the hollow tube shaped insert.

In an embodiment, the main section of the shaft part comprises one or more lubricant outlet openings at one or more respective axial positions along the central axis such that lubricant can flow at least partially from the second end of the shaft part into the one or more lubricant outlet openings.

According to another aspect, there is provided a dual clutch transmission system to be installed in a power train of a motor vehicle for selectively coupling three rotating transmission members, the dual clutch transmission system comprising the shaft assembly according to any one of the preceding claims.

According to another aspect, there is provided a motor vehicle comprising the dual clutch transmission system according to the previous aspect.

It will be understood that any advantage related to a particular feature of an aspect is applicable to like features of other aspects and vice versa. Embodiments of aspects relating to like parts of other aspects are also readily applicable to those other aspects.

It will also be understood that the shaft assemblies described herein as well as the transmission members and/or shaft part are usable in general transmission systems and not just the dual clutch transmission system described herein and will achieve the same or similar technical advantages as described herein. Features of the above aspects will be understood to be readily applicable to the other aspects. For instance, the stepped closed bore end section can applied with or without use of the insert, although the stepped closed bore end section provides particular advantages together with the insert.

In a further aspect, the present patent disclosure relates to a clutch assembly for a transmission system for a vehicle comprising at least a torque transmission assembly comprising an inner carrier and an outer carrier and a friction element assembly arranged between said inner and outer carrier, wherein said friction element assembly and said outer carrier are connected by means of a splined connection;

said torque transmission assembly having a engaged state, wherein said friction element assembly couples the inner carrier to the outer carrier, such that a torque can be transferred from the inner to the outer carrier; and said torque transmission assembly having a disengaged state, wherein the outer carrier is arranged to rotate with respect to the inner carrier along an axis;

wherein the friction element assembly abuts an inner surface of an annular drive plate that extends in at least the radial direction around said axis on a first end of said friction element assembly and wherein said annular drive plate is fixedly connected to said outer carrier at a welded section; and wherein at least one radially inwardly extending spline protrusion, running parallel to said axis, is arranged on an inner circumferential surface of the outer carrier and wherein said at least one radially inwardly extending spline protrusion runs at least until said drive plate, as seen along axis.

Clutch assemblies according to the prior art typically comprise a C-clip assembly, wherein the splines extend from the outer carrier through the drive plate. At the position where the splines extend through the drive plate, recesses and/or grooves are arranged for fitting and holding said C-clip. In order to allow the C-clip to be mounted, the different parts must have some minimum clearance which also results in potential play in the system. In addition, the splines extend in the axial direction, thereby increasing the overall length of the transmission system. As the space in the motor compartment of vehicles is typically limited and, especially nowadays, various different components and systems need to be fitted there, dimensions of relatively large parts such as the engine and transmission system are critical variables. For transmissions systems, the upper bounds on the axial length thereof are typically the most critical and any reduction in its dimensions, especially in the axial length, is of importance.

By constructing the clutch assembly such that the at least one radially inwardly extending spline protrusion running parallel to said axis (i.e. the splines extending from the outer carrier) that is arranged on an inner circumferential surface of the outer carrier and wherein said at least one radially inwardly extending spline protrusion runs at least until said drive plate, as seen along axis, the full interior width of the outer carrier is usable for holding the torque transmission element. By welding the annular drive plate to outer carrier, the C-clip mounting is no longer required, thereby allowing one to save space in the axial direction, but also, as the amount of play between components is reduced, a stiffer construction is obtained which is beneficial.

Preferably, said welded section is located substantially no further than the axial position of an axial outer end of said at least one radially inwardly extending spline protrusion. Hereby, the welded section does not add to the length of the overall construction, thus enabling a more compact system in the axial direction.

In a preferred embodiment, the annular drive plate is fixedly connected to an axial end of said outer carrier forming an annular contact surface in a plane substantially perpendicular to said axis and wherein said welded section extends in the annular contact surface in the radial direction. The welded section is thus arranged radially, such that the axial length can be further minimized. It is then preferred that the axial end of said outer carrier comprises a radially outwardly extending flange section and wherein said annular contact surface is formed between said flange section and the annular drive plate. Such a flange section allows to increase the contact surface between the outer carrier and the drive plate, such that a stiffer, more reliable and easier to weld connection is obtained, whereby no more space is required in the axial direction. It is noted the dimensional requirement in the radial direction are typically less critical.

In an alternative preferred embodiment of said clutch assembly, at least one radially inwardly extending spline protrusion extends axially outwardly with respect to an axial end of said outer carrier, wherein the drive plate comprises at least one through hole running from an inner side to an outer side of said drive plate, wherein said through hole is arranged for receiving said at least one axially extending spline protrusion, and wherein the inner side of said annular drive plate abuts the axial end of said outer carrier and wherein said at least one axially extending spline protrusion is fixedly connected to said annular drive plate by at least one welded section that at least partly extends in the axial direction from the outer side to the inner side of said drive plate. Hereby, the welded section does not add to the length of the overall construction, thus enabling a more compact system in the axial direction. In addition, the drive plate can be arranged to also extend further radially outwardly for connecting to, for instance, a second coaxially arranged clutch assembly.

It is then preferred that each respective radially inwardly extending spline protrusion extends axially outwardly with respect to the axial end of said outer carrier, wherein each respective axially extending spline protrusion is received in a respective through hole of the annular drive plate and wherein each axially extending spline protrusion is fixedly connected to said drive plate by a respective welded section. This also allows for a straightforward assembly, as the splines align with said through holes, while obtaining a relatively stiff connection. It is preferred if each welded section starts and ends at the respective drive plate, whereas a central section that is arranged between said start and end sections interconnects the spline protrusions extends axially outwardly with the drive plate. As the quality of a weld in its starting and ending section is typically less, or at least harder to control, a reliable interconnection can hereby be obtained.

In a further aspect, the present patent disclosure relates to an annular drive plate for a clutch assembly for a transmission system for a vehicle, wherein said annular drive plate comprises a central mounting hub for mounting a bearing, said central mounting hub comprising an annular protruding section that extends outwardly in an axial direction that is substantially perpendicular to the annular drive plate, said annular protruding section comprising a first portion and a mounting portion that is arranged for mounting the bearing, wherein the first portion and mounting portion are delimited by means of radially inwardly extending axial abutment section for limiting an axial movement of a mounted bearing in one axial direction, wherein said radially inwardly extending axial abutment section comprises ridge sections and valley sections along its perimeter, wherein a ridge section extends further inwardly in the radial direction compared to a valley section and wherein ridge sections and valley sections are alternatively arranged on said perimeter.

Such a drive plate is typically a forged or casted workpiece, making it a relatively expensive part, as the axial abutment section for limiting an axial movement of a mounted bearing in one axial direction, needs to have certain strength, and thereby thickness for reliably holding said mounted bearing. By providing an annular drive plate according to the present patent disclosure, the drive plate can be manufactured more simply using, for instance, a drawn metal plate. Such a plate preferably has a substantially evenly thickness before the drawing process turns it into said drive plate. In a second process step to from such a drive plate, material is locally plastically deformed for forming a ridge section for reliably holding the mounted bearing.

Preferably, a thickness of said first portion alternatively varies between a first thickness and a second thickness, wherein said first thickness is greater than said second thickness. In a second process step to from such a drive plate, material is locally plastically deformed and moved for forming a ridge section that is thereby forms a radially inwardly extending axial abutment section for reliably holding the mounted bearing. This process makes the wall thickness of the annular protruding section locally thinner.

In a further preferred embodiment of said annular drive plate, as seen in the axial direction, a section of the first portion having a first thickness corresponds to a valley section on the radially inwardly extending axial abutment section and a section of the first portion having a second thickness corresponds to a ridge section on the radially inwardly extending axial abutment section. By alternately providing such a ridge, the annular protruding section is still able to maintain a sufficient stiffness.

In a further aspect, the present patent disclosure relates to a method of manufacturing an annular drive plate according to any of the previous embodiment of said annular drive plate, comprising the steps of:
- providing a flat annular and/or circular plate, preferably a sheet metal plate;
- drawing said flat annular and/or circular plate for forming an annular protruding section that extends outwardly in an axial direction that is substantially perpendicular to the flat annular and/or circular plate;
- plastically deforming, preferably by means of punching, alternating sections of a first portion of said inner radial circumference of said annular protruding section to displace material of said alternating sections of the first portion for forming alternate ridge sections on an axial abutment section.

Preferably, the method further comprises the step of:
- machining a mounting portion on said inner radial circumference of said annular protruding section, wherein said mounting portion is delimited from said first portion by said axial abutment section.

In a further aspect, the present patent disclosure relates to an annular drive plate obtainable by the method of manufacturing. Hereby a drive plate is obtained that is more cost effective and easier to manufacture compared to a drive plate according to the prior art.

In a further aspect, the present patent disclosure relates to a clutch assembly according to any of the preceding embodiments, comprising the annular drive plate according to any of the preceding embodiments. Hereby, a more compact and cost effective clutch assembly for a transmission system for a vehicle is obtained.

In a further aspect, the present patent disclosure also relates to a dual-clutch assembly for a transmission system for a vehicle comprising two coaxially arranged clutch assemblies according to at least a previous embodiment, wherein one annular drive plate is fixedly connect to the outer carrier of the first clutch assembly and to the outer carrier of the second clutch assembly. This configuration is advantageous as it saves axial build in space.

Preferably, a first torque transmission assembly as described above is arranged radially outwardly with respect to a second torque transmission assembly, wherein said drive plate is fixedly connected to said second torque transmission assembly at a second radius with respect to the common axis and fixedly attached to said first torque transmission assembly at a first radius with respect to the common axis, and wherein said first radius is larger than said second radius. This configuration in particular saves additional axial build in space.

In a further aspect, the present patent disclosure also relates to a clutch subassembly for assembly onto a transmission system for a vehicle comprising at least a torque transmission assembly comprising a rotatable inner carrier and an subassembly housing member and a friction element assembly arranged between said inner carrier and subassembly housing member,
  said torque transmission assembly having a engaged state, wherein said friction element assembly couples the inner carrier to the subassembly housing member, such that a torque can be transferred from the inner carrier to the subassembly housing member; and
  said torque transmission assembly having a disengaged state, wherein the inner carrier is arranged to rotate with respect to the subassembly housing member along an axis;
  wherein said friction element assembly is constrained at a first axial end in a first axial direction along the axis by said subassembly housing member, wherein said friction element assembly is biased towards the second axial end in the second axial direction along the axis,
  characterized in that, in an unassembled state wherein the clutch subassembly is not assembled in the transmission system, the friction element assembly abuts an axial constraining system, wherein the subassembly housing member is arranged for receiving a friction element assembly contacting surface of said transmission system upon assembly of the clutch subassembly to the transmission system, such that in the assembled state wherein the clutch subassembly is assembled in the transmission system, the friction element assembly abuts friction element assembly contacting surface and is spaced apart from the axial constraining system.

In clutch subassemblies according to the prior art, the friction element assembly is not fully retained inside said subassembly housing member as it has an open end for receiving a friction element assembly contacting surface of said transmission system. Thereby, the friction element assembly, and especially the friction and pressure plates that are biased in a direction away from each other, can come apart during assembly. For instance, the different plates can fall out of the clutch subassembly, thereby making the assembly a tedious and difficult job. In the clutch subassembly according to this aspect, the clutch subassembly, in particular the subassembly housing member, is provided with an axial constraining system which constrains the friction element assembly, such that the different plates cannot be pushed out of, or fall out of, said subassembly housing member during assembly. At the same time, after assembly, the axial constraining system need not be removed, as the friction element assembly contacting surface of said transmission system contacts the friction element assembly upon assembly and urges the friction element assembly towards the first axial direction, such that in the assembled state, the friction element assembly no longer contacts the axial constraining system. Hereby, the assembly process is made substantially simpler and more reliable.

Preferably, said axial constraining system comprises at least three contact sections and wherein, in the unassembled state, the friction element assembly abuts the at least three contact sections. By providing three contact section, preferably spaced apart along the perimeter of the subassembly housing member, the plates are constrained in the axial direction, but also prevented from rotating with respect to the axial direction, whereby they could fall out. It allows for a reliable constraining of said friction element assembly in the unassembled state of said clutch subassembly.

In a preferred embodiment of the clutch subassembly, said friction element assembly and said subassembly housing member are connected by means of a splined connection; wherein said axial constraining system, preferably said at least three contact sections, are mounted, preferably bolted, to a radially inwardly extending spline-protrusions of said subassembly housing member. The radially inwardly extending spline-protrusions provide for a firm basis for connecting the axial constraining system, such that the axial constraining system preferably does not extend in the radial direction past the subassembly housing member.

In a further aspect, the present patent disclosure relates to a transmission system comprising a clutch subassembly according to any of the preceding embodiments, wherein said subassembly housing member is mounted to a housing member of the transmission system. Hereby a transmission system is obtained that can be assembled in a substantially simpler and more reliable manner.

The above and other advantages of the features and objects of the disclosure will become more apparent and the aspects and embodiments will be better understood from the following detailed description when read in conjunction with the accompanying drawings, which show preferred embodiments of the shaft assemblies and systems according to the present patent disclosure, and are not intended to limit the scope of the invention in any way, wherein:

FIG. 3 is a partial cross-section view of the transmission system of FIG. 1 comprising the shaft assembly;

FIG. 4 is a partial cross-section view of the transmission system of FIG. 2 comprising the shaft assembly;

FIG. 5 is a partial cross-section view of a stepped closed bore end section in a transmission member of the transmission system of FIG. 2;

Figure 1:
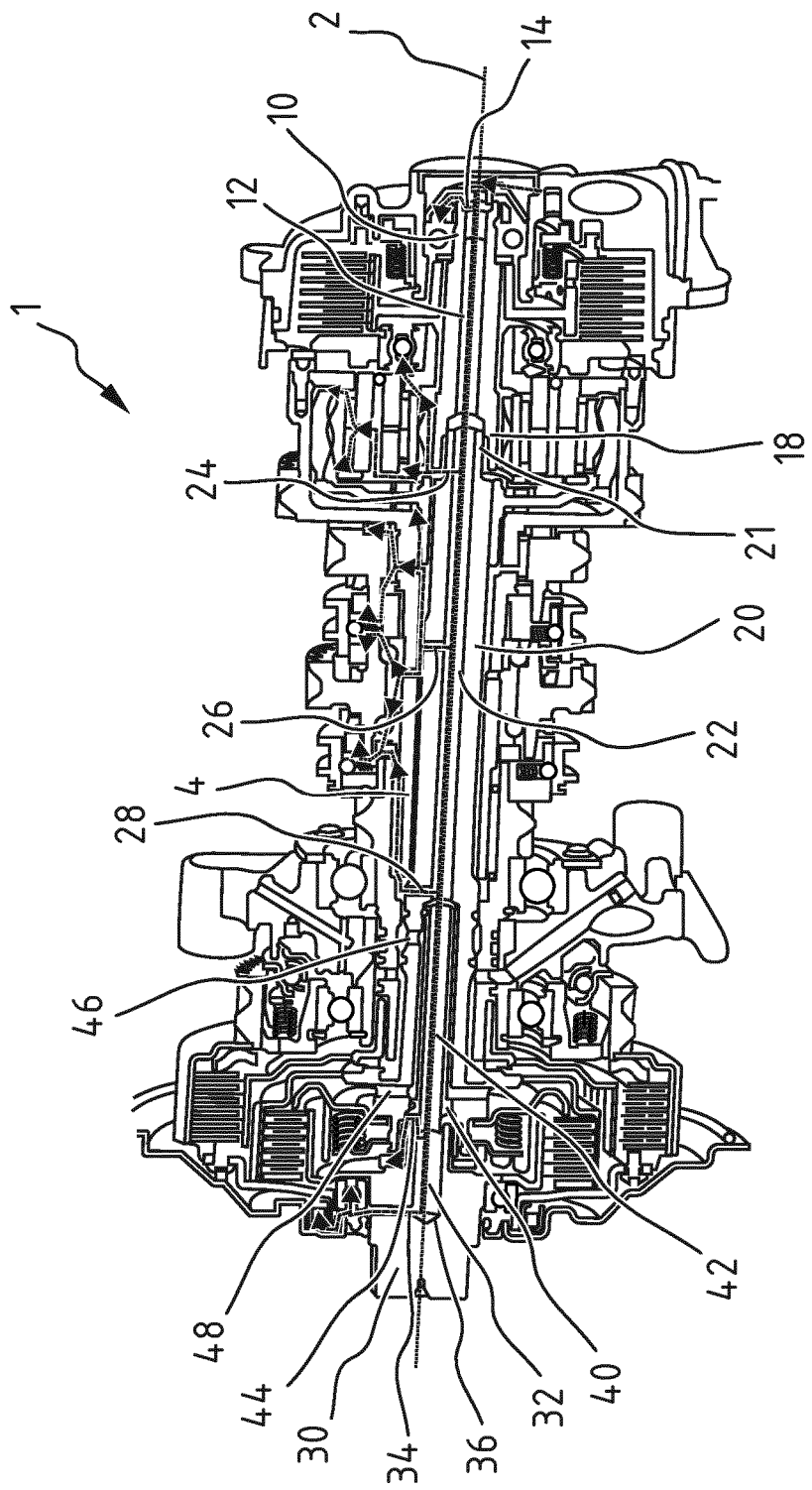
FIG. 1 is a schematic cross-sectional perspective view of a transmission system comprising a shaft assembly in accordance with one or more aspects of the present patent disclosure.

As shown in FIG. 1, the dual clutch transmission system 1 comprising a shaft assembly 4 comprising the first shaft part 20, the second shaft part 10 and the transmission member 30. The transmission member 30 may also be referred to as a third shaft part. The transmission member 30 may be arranged to transfer torque from an internal combustion engine. The shaft assembly extends along the central axis 2.

The second shaft part 10 may be rotatably arranged in the transmission system 1 and comprises a bore 12, a lubricant inlet opening 16 through which a flow of lubricant may enter the bore 12, an axial end 18 and a lubricant outlet opening 14 through which a part of the lubricant flow may exit the bore 12 for lubricating at least a part of the transmission system 1.

The first shaft part 20 may be rotatably arranged in the transmission system 1 and comprises a bore 22 extending through the first shaft part 20 from first axial end 25 to the second axial end 21. The second axial end 21 is rotatably attached to the axial end 18 of the second shaft part 10. Together, bore 12 and bore 22 define a part of a first lubricant channel.

The transmission member 30 may comprise a first axial end 31 and a second axial end 36 relative to the central axis 2, wherein the first axial end 31 is configured to be rotatably connected to the first shaft part 20 at the first axial end 25 thereof. The transmission member 30 comprises a bore 32 extending along the central axis 2 from the first axial end 31 in a direction towards the second axial end 36. The bore 32 is open at the first axial end 31. The second axial end may be a closed bore end 36 opposite the first axial end 31.

Figure 2:
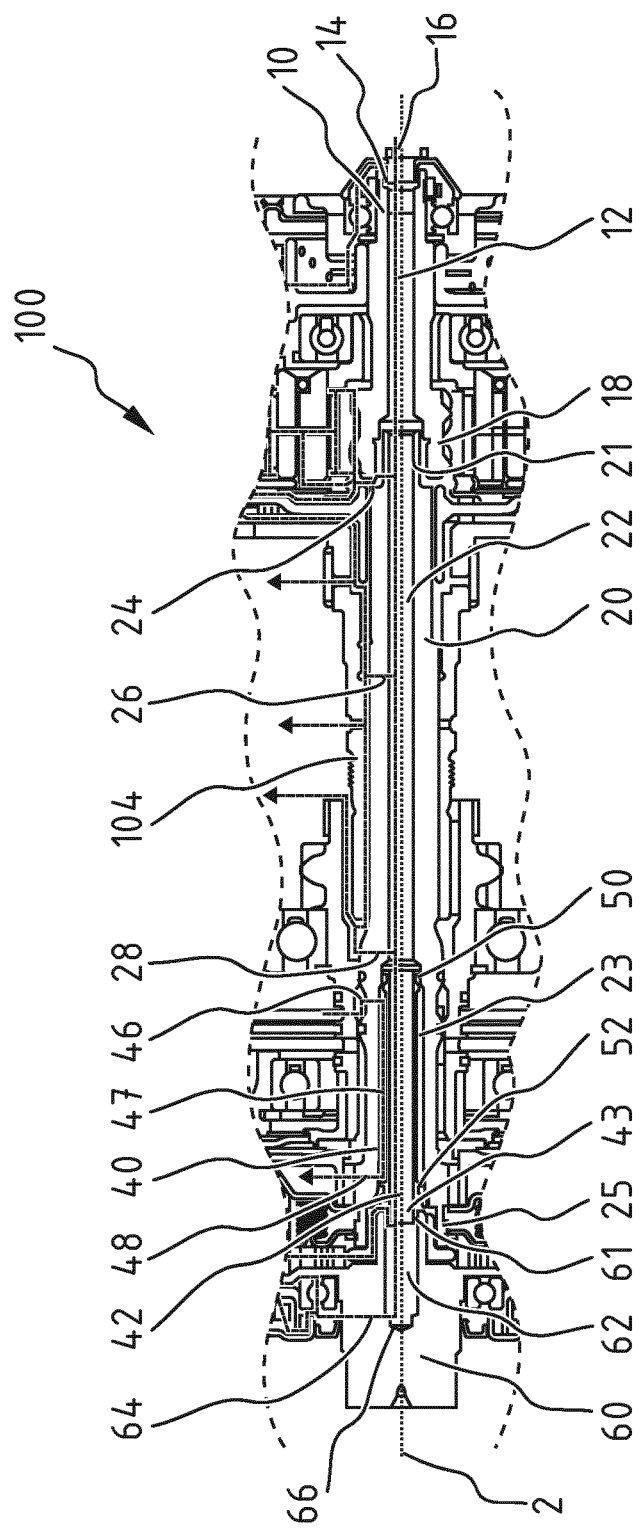
FIG. 2 is a schematic partial cross-section view of another transmission system comprising a shaft assembly in accordance with one or more aspects of the present patent disclosure.

FIGS. 2 and 4 show another transmission system 100, wherein all features are the same as described for transmission system 1, except that shaft assembly 104 comprises the first shaft part 20, the second shaft part 10 and the transmission member 60, which comprises a stepped bore end instead of the conventional bore end 36 of transmission member 30. Transmission member 60 may comprise a first axial end 61 and a second axial end 66 relative to the central axis 2, wherein the first axial end 61 is configured to be rotatably connected to the first shaft part 20. The transmission member 60 may comprise a bore 62 extending along the central axis 2 from the first axial end 61 in a direction towards the second axial end 66. The bore 62 is open at the first axial end 61. The second axial end may be a closed bore end 66 opposite the first axial end 61. As is better visible in FIG. 5, the bore 62 comprises a stepped closed bore end section 63 in which a diameter of the bore decreases stepwise towards the closed bore end 66.

The bore 62 has a first diameter 508 in main bore section 500 adjacent to the stepped closed bore end section 63, wherein the stepped closed bore end section 63 comprises a first diameter decreasing section 502 in which the bore diameter decreases from the first diameter 508 to a second intermediate diameter 510 and a second diameter decreasing section 506 in which the diameter of the bore 62 decreases from the second intermediate diameter 510 towards zero at the closed bore end 66.

The stepped closed bore end 66 comprises a constant diameter section 504 having the second intermediate diameter 510 and positioned between the first diameter decreasing section 502 and the second diameter decreasing section 506.

A ratio between the second intermediate diameter and the first diameter is in the range of 0.3 to 0.9, preferably in the range of 0.4 to 0.8, most preferably in the range of 0.51 to 0.78. For example, the diameter 508 may be 9 mm, while the diameter 510 may be 5 mm, with a ratio of about 0.55.

The transmission member 30 comprises a lubricant outlet opening 34 for allowing a lubricant fluid flow entering the transmission member at the first axial end 31 to exit the bore 32, wherein the lubricant outlet opening 34 is positioned along the bore 32 between the first axial end 31 and the bore end 36 and extends from the bore 32 towards an outer surface of the transmission member 30 in order to, in use, provide lubricant to at least a part of the dual clutch transmission system 1.

Likewise the transmission member 60 comprises a lubricant outlet opening 64 for allowing a lubricant fluid flow entering the transmission member at the first axial end 61 to exit the bore 62, wherein the lubricant outlet opening 64 is positioned along the bore 62 between the first axial end 61 and the stepped closed bore end 66 and extends from the bore 62 towards an outer surface of the transmission member 60 in order to, in use, provide lubricant to at least a part of the dual clutch transmission system 100.

The bore 32 and bore 62 of respectively the transmission member 30 and 60 may be referred to as first bore 32 and first bore 62 respectively, while the bore 22 of the first shaft part 20 may be referred to as a second bore 22.

The second bore 22 comprises a main section and an insert receiving section 23 at the first axial end 25 of the first shaft part 20 adjacent to the main section. The first shaft part 20 is rotatably connected at the insert receiving section 25 to the transmission member 30 (FIGS. 1 and 3) or 60 (FIGS. 2 and 4) at the first axial end 31 resp. 61 of the transmission member 30 resp. 60.

A hollow tube shaped insert 40 is placed in the bore 22 at the insert receiving section 23. The first lubricant channel thus also extends along the central axis 2 through the second bore 22 and an inside of the hollow tube shaped insert 40. An outer diameter of the hollow tube shaped insert 40 is smaller than an inner diameter of the second bore 22 at the insert receiving section 23 such that a second channel 47 is arranged between an outer side of the hollow tube shaped insert 40 and an outer circumference of the bore 22 at the insert receiving section 23 and concentrically relative to the first channel. The first channel and the second channel are thus separated from each other.

The hollow tube shaped insert 40 comprises a first end section extension 43 extending from the first end 25 of the first shaft part 20 and into at least a part of the first bore 32. An outer diameter of the first end section extension 43 is such that a lubricant flow path 44 is formed between an outer side of the first end section extension 43 and the part of resp. the first bore 32 and the first bore 62 into which the first end section extension 43 extends such that in use lubricant flows from the first bore 32 or the first bore 62 through the flow path 44 to lubricate at least a part of respectively the dual clutch transmission system 1 or the dual clutch transmission system 100.

The first shaft part 20 may comprise an actuation fluid inlet 46 and an actuation fluid outlet 48 in the insert receiving section 23 such that the second channel 47 represents an actuation fluid channel. In the transmission systems 1 and 100, the actuation fluid inlet 46 and actuation fluid outlet 48 are aligned with respective actuation fluid channels of the dual clutch transmission system such that the actuation fluid is used for selectively coupling at least one of the transmission members of the dual clutch transmission system. For instance, one or more pistons may be actuated for activating one or more respective clutches.

Preferably, the main section of the bore 21 has a third diameter and the insert receiving section 23 has a fourth diameter, wherein the fourth diameter is larger than the third diameter. More preferred is that an inner diameter of the hollow tube shaped insert 40 is substantially equal to the third diameter of the bore 21.

The hollow tube shaped insert 40 may comprise a first sealing member 50 and a second sealing member 52 at an outer side of the hollow tube shaped insert 40 for separating the second channel 47 that is formed between the first 50 and second 52 sealing members is separated from the first channel represented by the bores 12, 22 and 32/62. The sealing members 50 and 52 may comprise O-rings held between respective protrusions extending from the outer circumference of the hollow tube shaped insert 40.

The main section of the first shaft part 20 comprises lubricant outlet openings 24, 26 and 28 at respective axial positions along the central axis 2. Lubricant can thus flow from the second end 21 of the first shaft part 20 into the lubricant outlet openings 24, 26 and 28.

Figure 6:
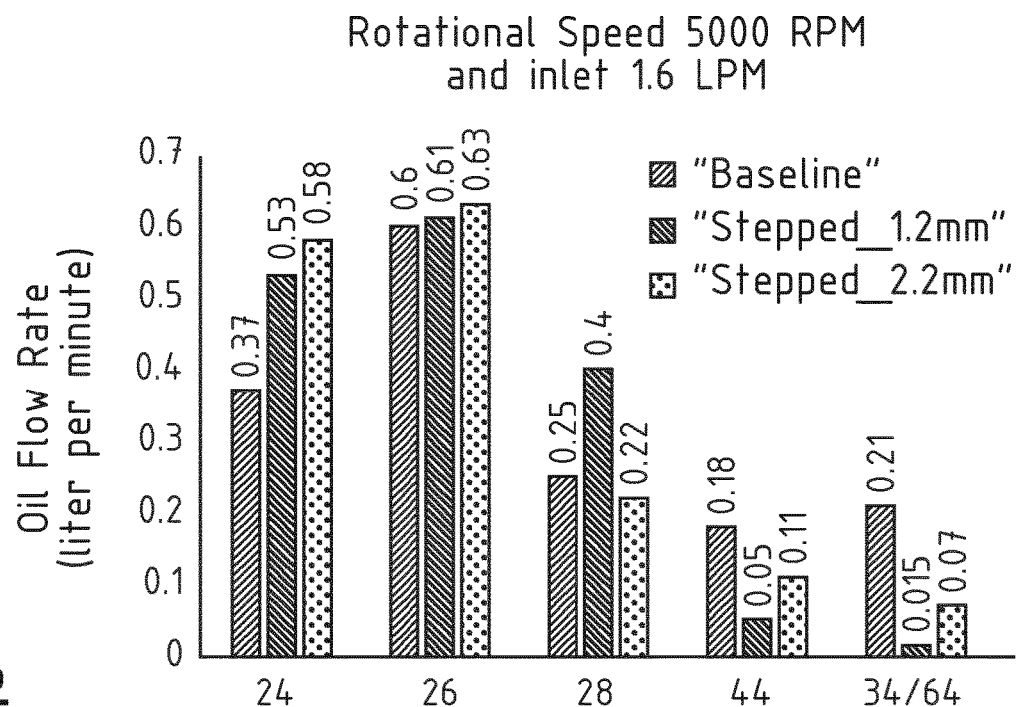
FIG. 6 is a bar plot comparing oil flow rates at 5000 RPM and an inlet flow of 1.6 liter per minute of oil at various outlet openings of a conventional closed bore end section with stepped closed bore end sections according to one or more aspects of the present patent disclosure.
Figure 7:
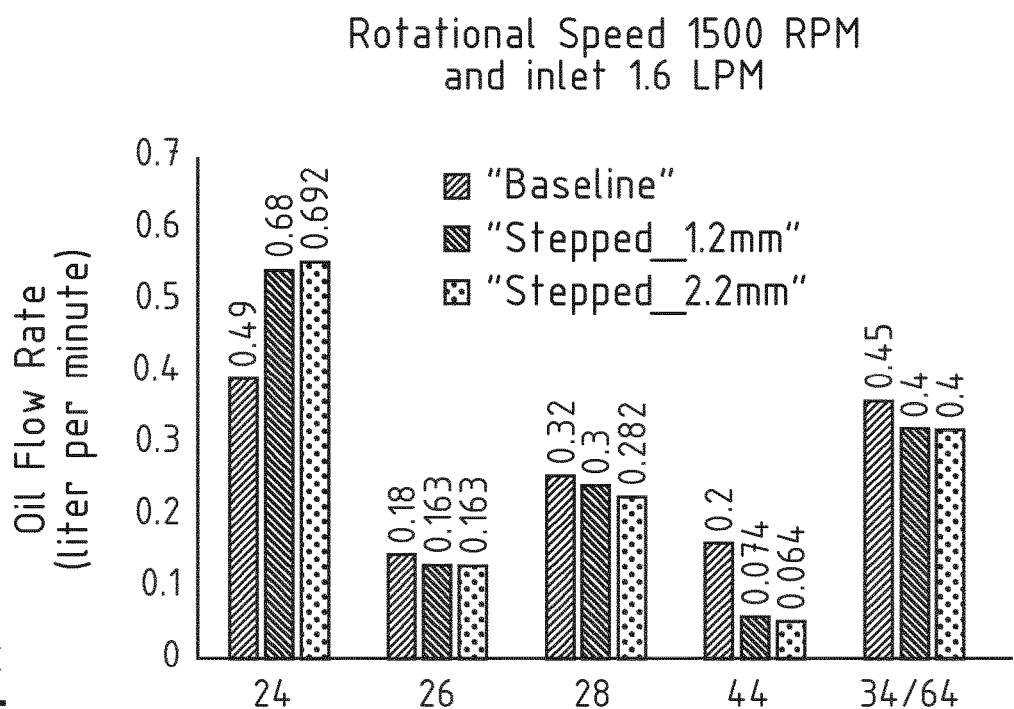
FIG. 7 is a bar plot comparing oil flow rates at 1500 RPM and an inlet flow of 1.6 liter per minute of oil at various outlet openings of a conventional closed bore end section with stepped closed bore end sections according to one or more aspects of the present patent disclosure.

In FIGS. 6 and 7, a comparison is made of lubricant flow through openings 24, 26, 28, 44 and 34 of transmission system 2 with a conventional bore end 36 and lubricant flow through openings 24, 26, 28, 44 and 64 of transmission system 100 with the improved stepped bore end 66 of the present patent disclosure. FIG. 6 shows results of the flow rates at the various openings in liter per minute at a rotational speed of 5000 RPM and an inlet flow of 1.6 liter per minute, while FIG. 7 shows results of the flow rates at the various openings in liter per minute at a rotational speed of 1500 RPM and an inlet flow of 1.6 liter per minute. In FIGS. 6 and 7, "baseline" indicates the results for the transmission system 1 with the conventional bore end 36. The dataset "stepped_1.2 mm" indicates the results for the transmission system 100 with the bore end 66 with diameter 508 of 9 mm and a step of 1.2 mm at section 502, thus making the diameter 510 equal to 9−2.4=6.6 mm. The dataset "stepped_2.2 mm" indicates the results for the transmission system 100 with the bore end 66 with diameter 508 of 9 mm and a step of 2.2 mm at section 502, thus making the diameter 510 equal to 9−2.4=4.6 mm.

At 5000 RPM (FIG. 6), it can be seen that the flow at opening 24 is increased for both stepped datasets, while the flow is reduced at openings 44 and 64. The flow at openings 26 and 28 remains roughly the same, thus achieving the goal of increasing the flow farther away from the bore end 66 in the transmission member 60, and decreasing the flow closer to the bore end 66.

Also at 1500 RPM (FIG. 7), it can be seen that the flow at opening 24 is increased for both stepped datasets, while the flow is reduced at openings 44 and 64. The flow at openings 26 and 28 remains roughly the same, thus also achieving the goal of increasing the flow farther away from the bore end 66 in the transmission member 60, and decreasing the flow closer to the bore end 66, at lower rotational speeds.

Figure 8:
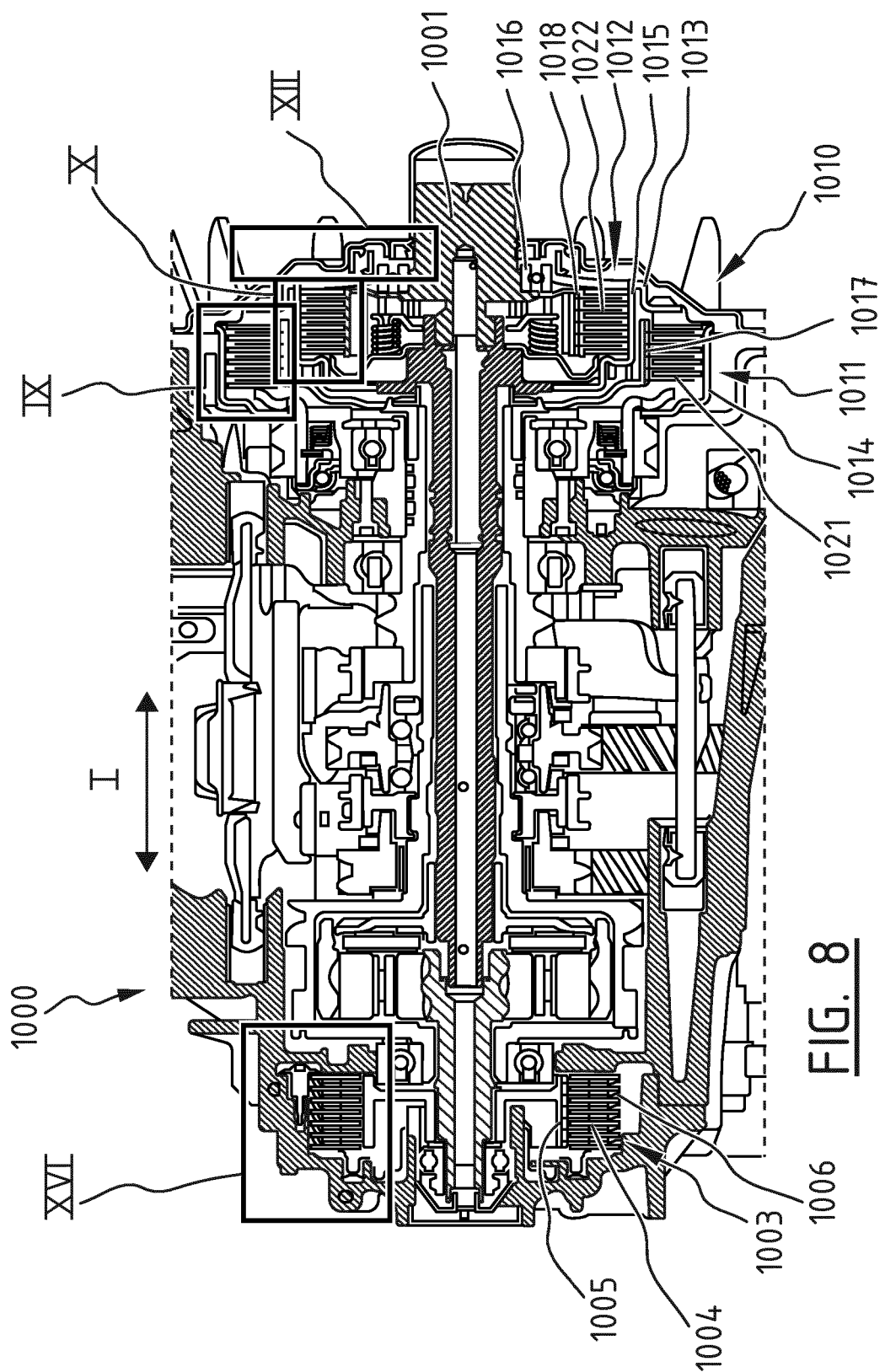
FIG. 8 is a schematic cross-sectional view of a transmission system comprising the embodiments of respective aspects of the invention.

FIG. 8 is a schematic cross-sectional view of an embodiment of a transmission system 1000 comprising the embodiments of respective aspects of the invention, wherein said transmission system 1000 comprises at a first end input shaft 1001, a dual-clutch assembly 1010 comprising first clutch assembly 1011 and second clutch assembly 1012, wherein the first and second clutch assemblies 1011, 1012 are arranged coaxially. The first and second clutch assemblies 1011, 1012 comprise respective first and second outer carriers 1014, 1015 that are interconnected by means of drive plate 1013 that is rotatably supported by bearing unit 1016. At a second, opposite end, the transmission system 1000 further comprises a third clutch assembly 1003. The clutch assemblies 1011, 1012, 1003 in the embodiment shown are so called multi-plate clutches.

Such multi-plate clutch assemblies 1011, 1012, 1003 comprise at least one friction coupling member comprising a respective inner carrier 1017, 1018, 1005 and a respective outer carrier 1014, 1015, 1006, wherein at least one of said inner 1017, 1018, 1005 and outer carriers 1014, 1015, 1006 is rotatable around a first axis, each comprising a friction element assembly 1021, 1022, 1004 comprising a respective first set of plates is rotatably connected to the inner carrier 1017, 1018, 1005 and arranged between the inner 1017, 1018, 1005 and outer carrier 1014, 1015, 1006 and a second set of plates is rotatably connected to the outer carrier 1014, 1015, 1006 and arranged between the inner 1017, 1018, 1005 and outer carrier 1014, 1015, 1006, wherein the plates of the respective first and second set of plates are, as seen in an axial direction I along said first axis, alternately arranged and overlapping in the radial direction, wherein, in a coupled state, the respective alternately arranged plates of the first and second set abut each other, such that a torque can be transferred from the inner 1017, 1018, 1005 to the outer carrier 1014, 1015, 1006 and wherein, in an uncoupled state, the respective alternately arranged plates of the first and second set are spaced apart, such that said outer carrier 1014, 1015, 1006 is arranged to rotate relative to said inner carrier 1017, 1018, 1005.

Figure 9:
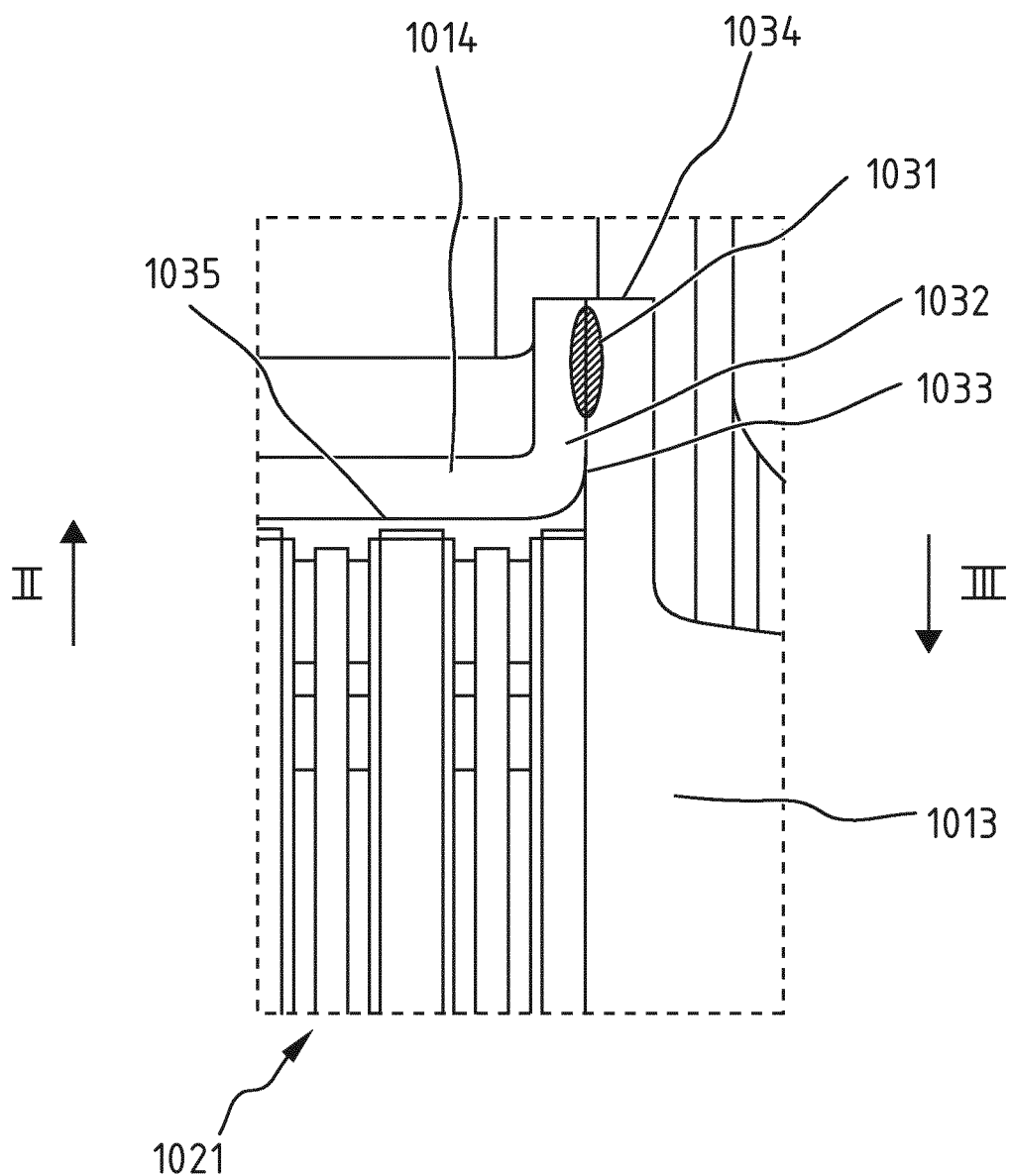
FIG. 9 is a schematic cross-sectional view zoomed in on an embodiment of a clutch assembly for a transmission system.

FIG. 9 is a schematic cross-sectional view zoomed in on an embodiment of a clutch assembly 1011 for a transmission system 1000 showing the outer carrier 1014, the friction element assembly 1021 and the drive plate 1013. The outer carrier 1014 comprises a radially extending flange section 1032 that extend, with respect to outer carrier 1014 in the radial direction II. The annular contact section 1033 is provided with a welded section 1031 for fixedly connecting the outer carrier 1014 to the drive plate 1013. The weld 1031 is preferably made from a radial outer edge 1034 in an inwardly radial direction III. The weld, preferably, does not extend beyond the inner surface 1035 of the outer carrier 1014.

Figure 10:
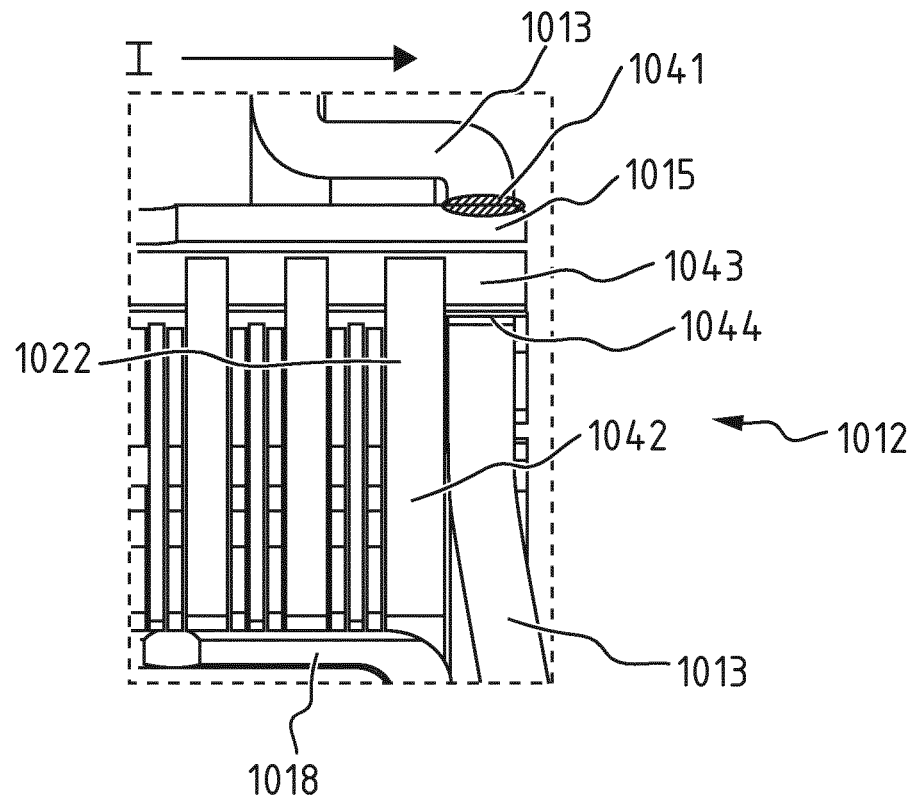
FIG. 10 is a schematic cross-sectional view zoomed in on a second embodiment of a clutch assembly for a transmission system.
Figure 11:
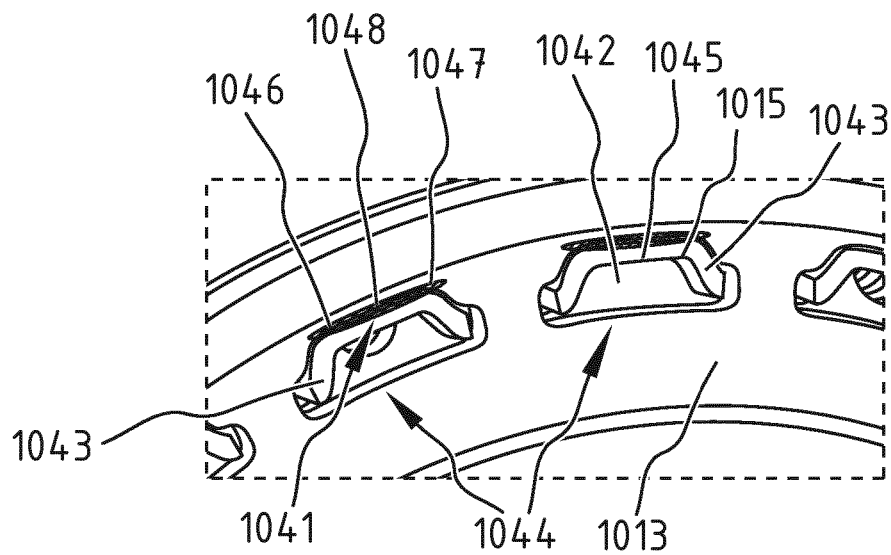
FIG. 11 is a three-dimensional schematic view zoomed in on the second embodiment of the clutch assembly for a transmission system.

FIG. 10 is a schematic cross-sectional view zoomed in on a second embodiment of a clutch assembly 1012 for a transmission system 1000. Drive plate 1013, which abuts a plate of the friction element assembly 1022, is welded to the outer carrier 1015 at a welded section 1041 that runs parallel to the axial direction I between the drive plate 1013 and the outer carrier 1015. In the three-dimensional schematic view of FIG. 11 it is seen that the plate 1042 is rotationally locked to the outer carrier 1015 by means of spline protrusion 1043. Said spline protrusions 1043 and sections 1045 of said outer carrier 1015 extend in the axial direction I and are received in cooperating through holes 1044 arranged in the drive plate 1013. In the specific embodiment, each of the axially extending splines 1043 and sections 1045 are received in a cooperating through hole 1044. The welded sections 1041 fixedly interconnecting the axially extending splines 1043 and sections 1045 to the drive plate 1013 comprise a start and end section 1046, 1047 and a central section 1048, as explained earlier.

Figure 12:
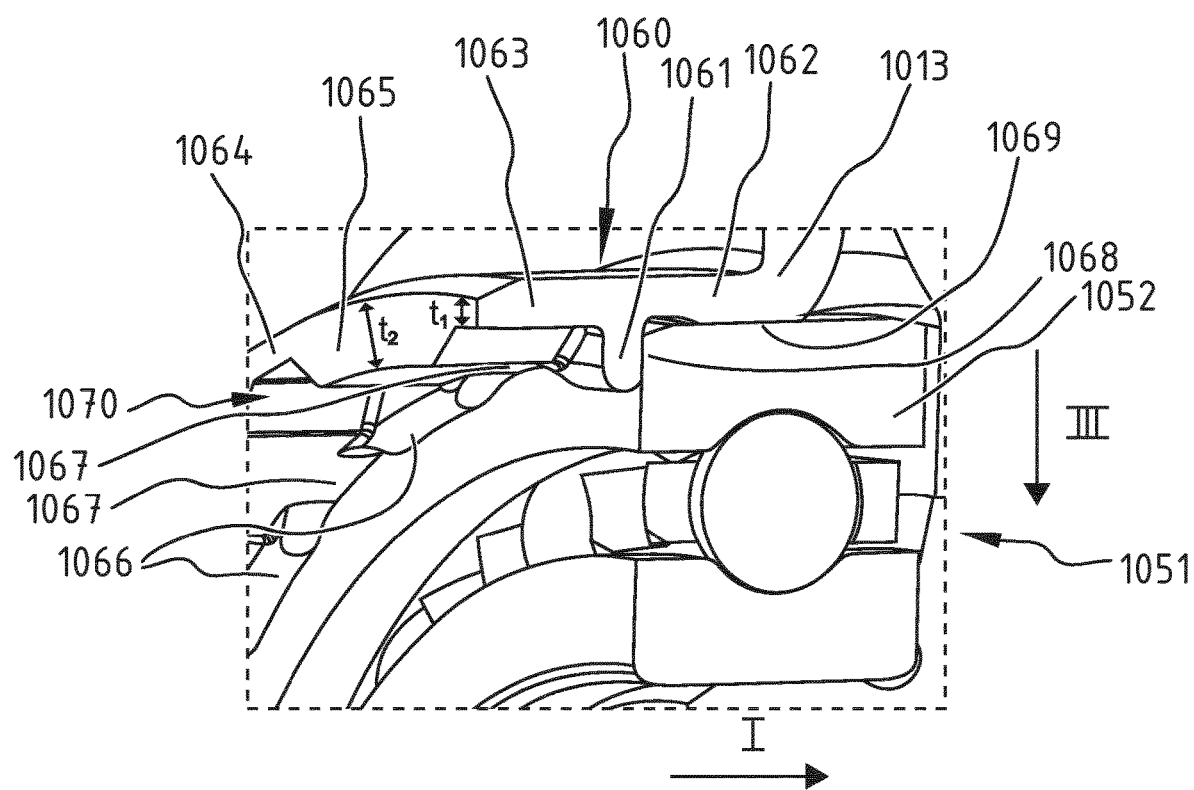
FIG. 12 is a three-dimensional schematic view zoomed in on a central mounting hub of an embodiment of an annular drive plate for a clutch assembly for a transmission system.

FIG. 12 is a three-dimensional schematic view zoomed in on a central mounting hub 1060 of an embodiment of an annular drive plate 1013 for a clutch assembly for a transmission system 1000. The central mounting hub 1060 is formed by an annular protruding section and comprises a first portion 1063 and a mounting portion 1062 that is arranged for mounting the bearing 1051. The first portion 1063 and mounting portion 1062 are delimited in the axial direction I by means of a radially inwardly extending axial abutment section 1061 for limiting an axial movement of a mounted bearing 1051 in one direction parallel to the axial direction I. The radially inwardly extending axial abutment section 1061 comprises ridge sections 1066 and valley sections 1067 along its perimeter. A ridge section 1066 extends further inwardly in the radial direction along direction III as compared to a valley section 1067 and the ridge sections 1066 and valley sections 1067 are alternatively arranged on the perimeter of the radially inwardly extending axial abutment section 1061. A contact surface 1068 of the radially inwardly extending axial abutment section 1061 contacts the bearing 1051, in particular an axial end of the outer ring 1052 comprising outer raceway of the bearing 1051. The outer surface of the outer ring 1052 contacts a machined surface 1069 arranged in the mounting portion 1062, thereby locking the bearing 1051 in all radial directions with respect to the annular drive plate 1013.

Figure 13:
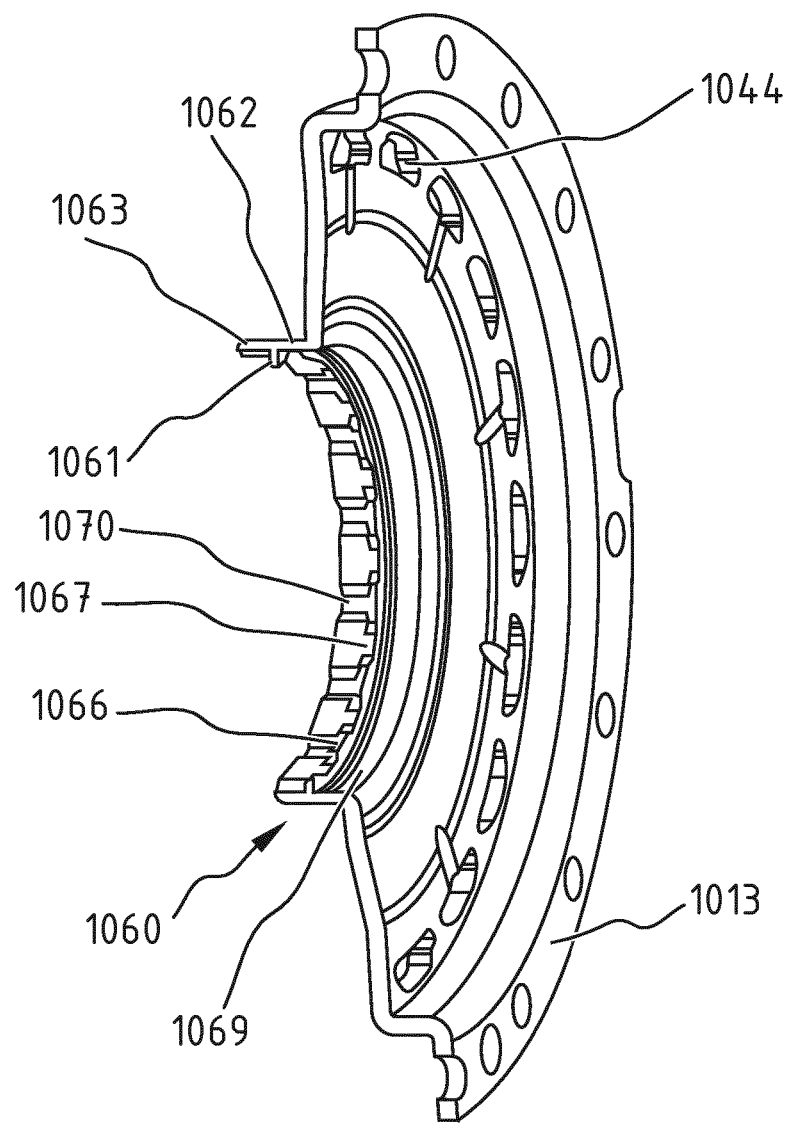
FIG. 13 is a three-dimensional schematic view of the embodiment of an annular drive plate for a clutch assembly for a transmission system.

The ridges 1066 are formed by plastically deforming, preferably by means of punching, alternating sections of a first portion 1063 of the inner radial circumference of said annular protruding section 1060 to displace material of the alternating sections 1070 of the first portion 1063 for forming alternate ridge sections 1066 on the axial abutment section 1061. Thereby the thickness t1 of the alternating sections 1070 is locally reduced, when compared to the nominal thickness t2 of the annular protruding section 1060. By not plastically deforming the entire circumference of the annular protruding section 1060, but only alternating sections 1070, a relatively stiff annular protruding section 1060 is maintained, while still enabling the formation of a stiff and reliable radially inwardly extending axial abutment section 1061. This allows the drive plate 1013 to be manufactured from flat plate material, such as sheet metal, by means of drawing. A cross-sectional three-dimensional schematic view of such a drawn drive plate 1013 is shown in FIG. 13, which also shows the cooperating through holes 1044 as discussed earlier.

Figure 14:
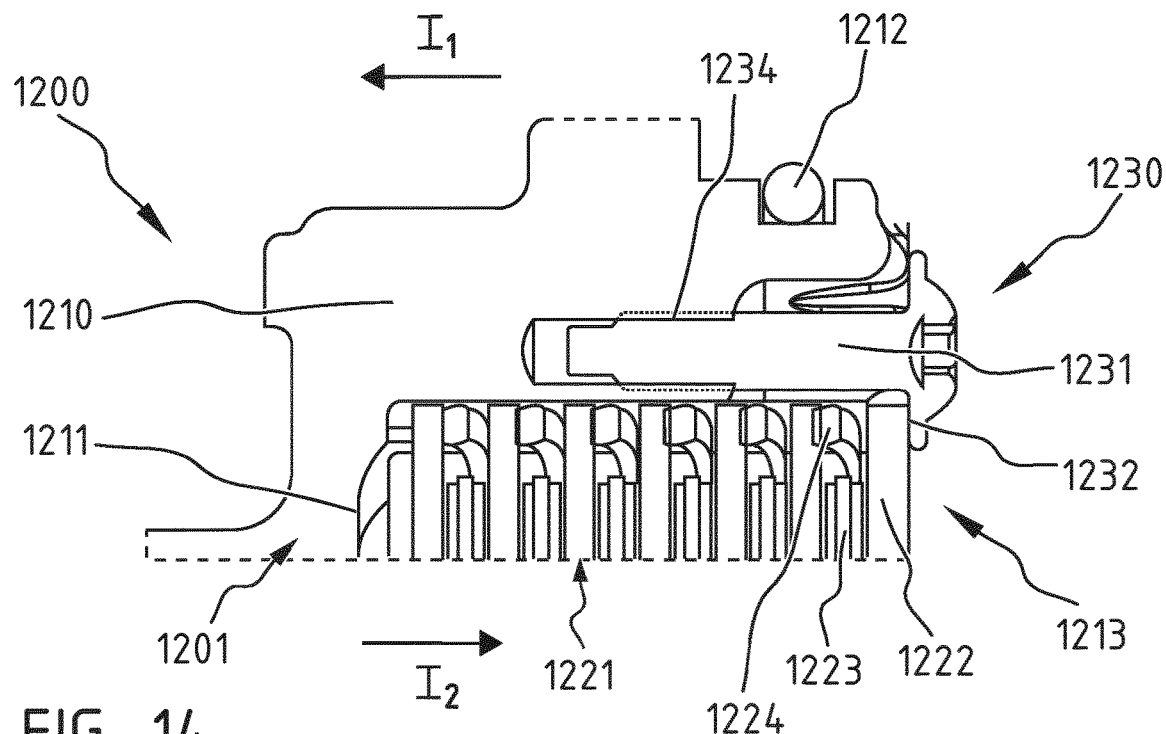
FIG. 14 is a schematic cross-sectional view zoomed in on an embodiment of an unassembled clutch subassembly for assembly onto a transmission system for a vehicle.
Figure 15:
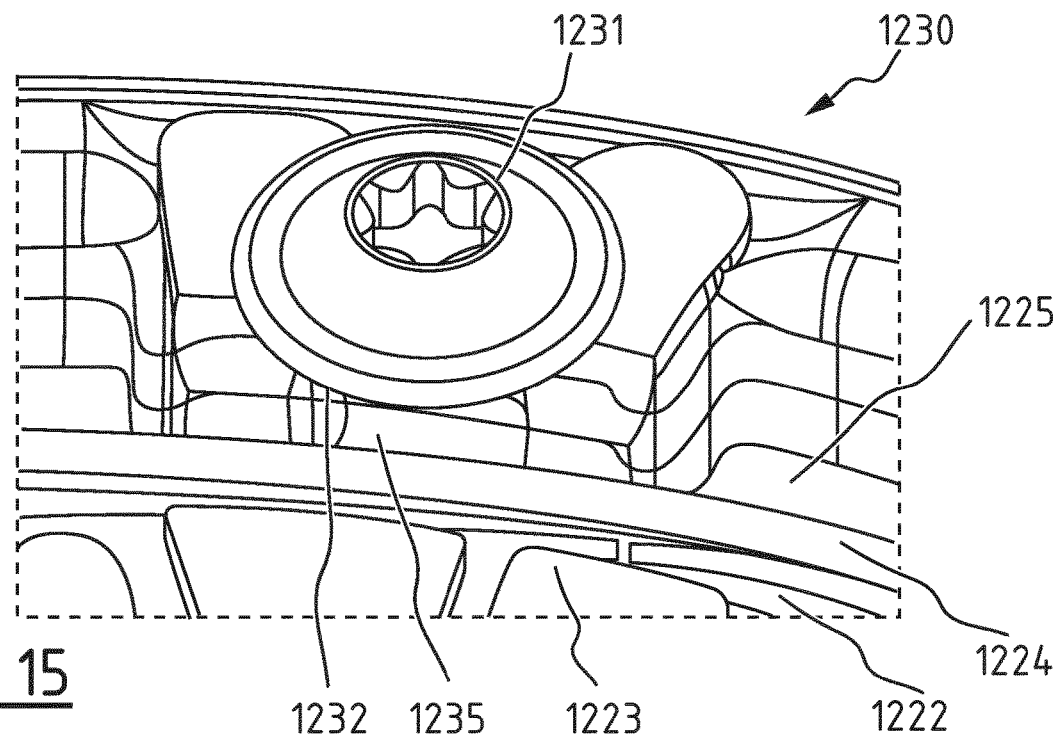
FIG. 15 is a three-dimensional schematic view zoomed in on the unassembled clutch subassembly for assembly onto a transmission system for a vehicle.
Figure 16:
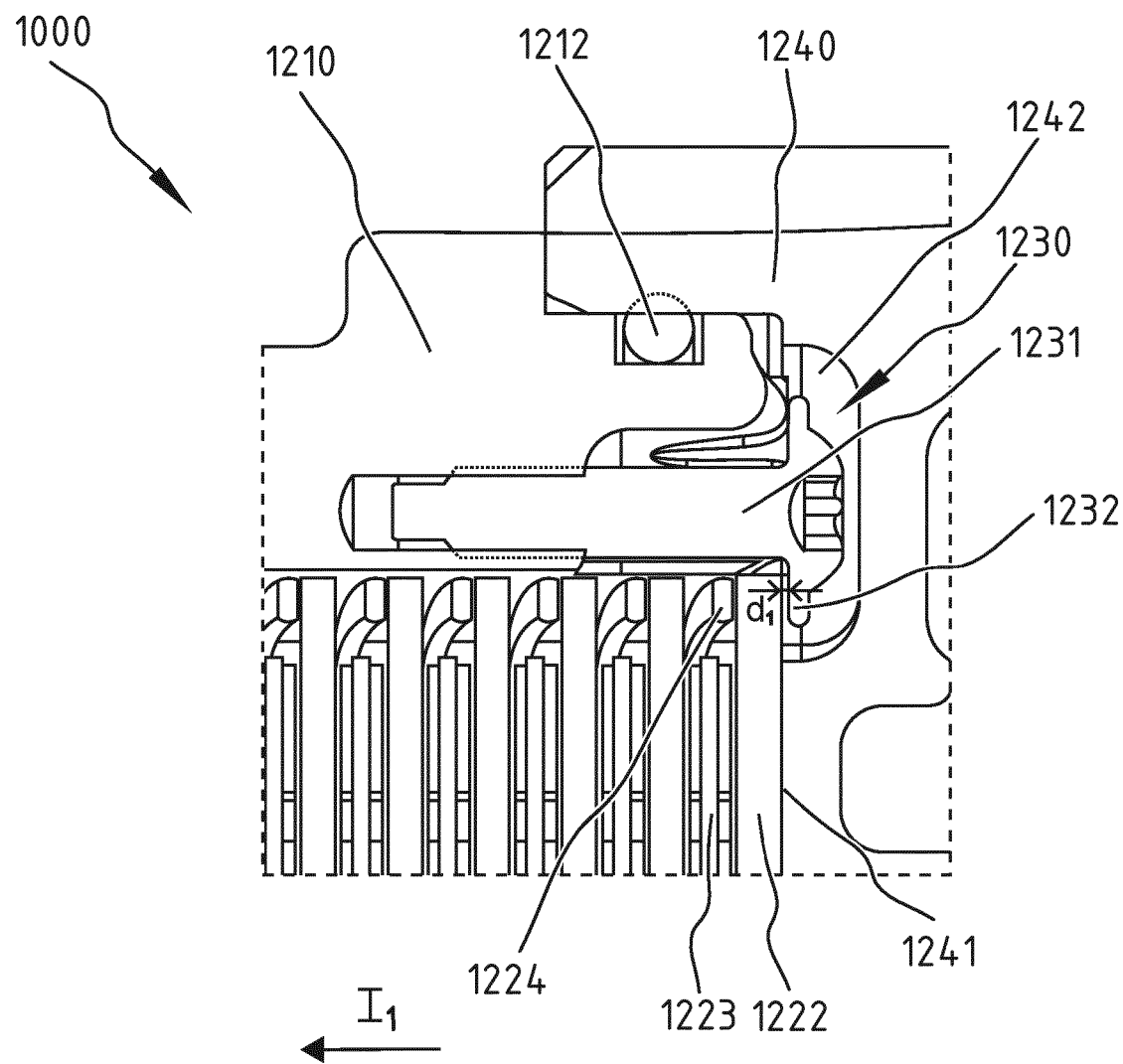
FIG. 16 is a schematic cross-sectional view zoomed in on an embodiment of the assembled clutch subassembly for assembly onto a transmission system for a vehicle.

FIG. 14 is a schematic cross-sectional view zoomed in on an embodiment of an unassembled clutch subassembly 1200 for assembly onto a transmission system 1000 for a vehicle. Clutch subassembly 1200 comprising at least a torque transmission assembly 1201 comprising a rotatable inner carrier and an subassembly housing member 1210 and a friction element assembly 1221 arranged between the inner carrier and subassembly housing member 1210. The friction element assembly 1221 comprises coupling plates 1222 that are rotatably connected to the subassembly housing member 1210 by means of a spline connection 1225 (see FIG. 14). Between the coupling plates 1222, friction plates 1223 and biasing members 1224 are arranged, wherein the biasing members 1224 urge the respective plates 1222, 1223 into a second axial direction I2 that is parallel to the axial direction, as the friction element assembly 1221 is constrained at a first axial end in a first axial direction I1 along the axis by said subassembly housing member 1210. Due to this urging action of the biasing members 1224, the respective plates 1222, 1223 are biased towards an uncoupled state wherein the respective plates 1222, 1223 are space apart, i.e. the unengaged state. An axial constraining system 1230 is provided for limiting the movement of the respective plates 1222, 1223 in the second axial direction I2, such that they cannot fall out of an open second end 1213 of the subassembly housing member 1210 in the unassembled state.

The axial constraining system 1230 is hereto provided with a plurality of retaining bolts 1231, preferably at least three retaining bolts 1231, wherein the friction element assembly 1221 abuts a contact surface 1232 of said retaining bolt 1231 that is placed in a retaining bolt bore 1234 arranged in a spline protrusion 1235 of the subassembly housing member 1210.

The subassembly housing member 1210 can be mounted and fixed, for instance by bolts, in a transmission system housing 1240 that comprises a friction element assembly contacting surface 1241 that is arranged to be received in the open second end 1213 of the subassembly housing member 1210. Upon assembly, the friction element assembly 1221, in particular an outer coupling plate 1222, contacts the friction element assembly contacting surface 1241 thereby pushing it in the first axial direction I1, such that a non-zero distance d1 is obtained between the contact surface 1232 of said retaining bolt 1231 and the respective coupling plate 1222. The retaining bolt 1231 is then received in a corresponding space arranged in the transmission system housing 1240, such that it does not need to be removed. A sealing member 1212 is arranged for sealing an interior of the transmission system housing 1240.

The description of the different illustrative configurations has been presented for purposes of illustration and description and is not intended to be exhaustive or limited to the configurations in the form disclosed. Many modifications and variations will be apparent to those of skill in the art. Further, different illustrative configurations may provide different features as compared to other illustrative configurations. The configuration or configurations selected are chosen and described in order to best explain the principles of the configurations, the practical application, and to enable others of ordinary skill in the art to understand the disclosure for various configurations with various modifications as are suited to the particular use contemplated.

The invention claimed is:

1. A shaft assembly for use in a dual clutch transmission system to be installed in a power train of a motor vehicle for selectively coupling three rotating transmission members, wherein the shaft assembly extends along a central axis and comprises:
   a transmission member comprising
      a first axial end and a second axial end relative to the central axis, wherein the first axial end is configured to be rotatably connected to a shaft part, and
      a first bore extending along the central axis from the first axial end in a direction towards the second end, wherein the first bore is open at the first axial end and comprises a closed bore end opposite the first axial end, wherein the first bore comprises a stepped closed bore end section in which a diameter of the first bore decreases stepwise towards the closed bore end;
   a shaft part comprising a second bore extending along the central axis from a first axial end of the shaft part to a second axial end of the shaft part, wherein the second bore comprises a main section and an insert receiving section at the first axial end of the shaft part adjacent to the main section; and
   a hollow tube shaped insert placed in the bore at the insert receiving section, wherein a first channel extends through the bore and an inside of the hollow tube shaped insert, wherein an outer diameter of the hollow tube shaped insert is smaller than an inner diameter of the bore at the insert receiving section such that a second channel is arranged between the hollow tube shaped insert and the shaft part and concentrically relative to the first channel.

2. The shaft assembly according to claim 1, wherein the first bore has a first diameter adjacent to the stepped closed bore end section, wherein the stepped closed bore end comprises a first diameter decreasing section in which the first bore diameter decreases from the first diameter to a second intermediate diameter and a second diameter decreasing section in which the diameter of the first bore decreases from the second intermediate diameter towards zero at the closed bore end.

3. The shaft assembly according to claim 2, wherein the stepped closed bore end comprises a constant diameter section having the second intermediate diameter and positioned between the first diameter decreasing section and the second diameter decreasing section.

4. The shaft assembly according to claim 2, wherein a ratio between the second intermediate diameter and the first diameter is in the range of 0.3 to 0.9.

5. The shaft assembly according to claim 1, wherein the transmission member comprises a lubricant outlet opening for allowing a lubricant fluid flow entering the transmission member at the first axial end to exit the first bore, wherein the lubricant outlet opening is positioned along the first bore between the first axial end and the stepped closed bore end and extends from the first bore towards an outer surface of the transmission member in order to, in use, provide lubricant to at least a part of the dual clutch transmission system.

6. The shaft assembly according to claim 1, wherein
   the shaft part is rotatably connected at the insert receiving section to the transmission member at the first axial end of the transmission member; and
   wherein the first channel extends along the central axis through the bore, wherein the second channel is arranged between an outer side of the hollow tube shaped insert and an outer circumference of the bore at the insert receiving section, and, wherein the first channel and the second channel are separated from each other.

7. The shaft assembly according to claim 6, wherein the hollow tube shaped insert comprises a first end section extension extending from the first end of the shaft part and into at least a part of the first bore, wherein an outer diameter of the first end section extension is such that a lubricant flow path is formed between an outer side of the first end section extension and the part of the first bore into which the first end section extension extends such that in use lubricant flows from the first bore through the flow path to lubricate at least a part of the dual clutch transmission system.

8. The shaft assembly according to claim 1, wherein the hollow tube shaped insert comprises a first end section extension extending from the first end of the shaft part and configured to extend into at least a part of a first bore of one of the transmission members arranged along the central axis and configured to be rotatably attached to the shaft part at the first end thereof, wherein an outer diameter of the first end section extension is such that, in use, a lubricant flow path is formed between an outer side of the first end section extension and the part of the first bore of one of the transmission members into which the first end section extension is configured to extend.

9. The shaft assembly according to claim 1, wherein the shaft part comprises an actuation fluid inlet and an actuation fluid outlet in the insert receiving section such that the second channel represents an actuation fluid channel, wherein preferably, in use, the actuation fluid inlet and actuation fluid outlet are aligned with respective actuation fluid channels of the dual clutch transmission system such that the actuation fluid is used for selectively coupling at least one of the transmission members of the dual clutch transmission system.

10. The shaft assembly according to claim 6, wherein the main section of the second bore has a first diameter and the insert receiving section has a second diameter, wherein the second diameter is larger than the first diameter, wherein preferably an inner diameter of the hollow tube shaped insert is substantially equal to the first diameter of the second bore.

11. The shaft assembly according to claim 1, wherein the hollow tube shaped insert comprises a first sealing member and a second sealing member at an outer side of the hollow tube shaped insert for separating the second channel that is formed between the first and second sealing members is separated from the first channel.

12. The shaft assembly according to claim 1, wherein the main section of the shaft part comprises one or more lubricant outlet openings at one or more respective axial positions along the central axis such that lubricant can flow at least partially from the second end of the shaft part into the one or more lubricant outlet openings.

13. A dual clutch transmission system to be installed in a power train of a motor vehicle for selectively coupling three rotating transmission members, the dual clutch transmission system comprising the shaft assembly according to claim 1.

14. A motor vehicle comprising the dual clutch transmission system according to claim 13.

15. A shaft assembly for use in a dual clutch transmission system to be installed in a power train of a motor vehicle for selectively coupling three rotating transmission members, wherein the shaft assembly extends along a central axis and comprises:
  a transmission member comprising:
    a first axial end and a second axial end relative to the central axis, wherein the first axial end is configured to be rotatably connected to a shaft part; and
    a first bore extending along the central axis from the first axial end in a direction towards the second end, wherein the first bore is open at the first axial end and comprises a closed bore end opposite the first axial end,
  wherein the first bore comprises a stepped closed bore end section in which a diameter of the first bore decreases stepwise towards the closed bore end;
  the shaft part comprising a second bore extending along the central axis from a first axial end of the shaft part to a second axial end of the shaft part, wherein the second bore comprises a main section and an insert receiving section at the first axial end of the shaft part adjacent to the main section, wherein the shaft part is rotatably connected at the insert receiving section to the transmission member at the first axial end of the transmission member; and
  a hollow tube shaped insert placed in the bore at the insert receiving section, wherein a first channel extends along the central axis through the bore and an inside of the hollow tube shaped insert, wherein an outer diameter of the hollow tube shaped insert is smaller than an inner diameter of the bore at the insert receiving section such that a second channel is arranged between an outer side of the hollow tube shaped insert and an outer circumference of the second bore at the insert receiving section and concentrically relative to the first channel, wherein the first channel and the second channel are separated from each other.

16. The shaft assembly according to claim 15, wherein the hollow tube shaped insert comprises a first end section extension extending from the first end of the shaft part and into at least a part of the first bore, wherein an outer diameter of the first end section extension is such that a lubricant flow path is formed between an outer side of the first end section extension and the part of the first bore into which the first end section extension extends such that in use lubricant flows from the first bore through the flow path to lubricate at least a part of the dual clutch transmission system.

17. The shaft assembly according to claim 15, wherein the main section of the second bore has a first diameter and the insert receiving section has a second diameter, wherein the second diameter is larger than the first diameter, wherein preferably an inner diameter of the hollow tube shaped insert is substantially equal to the first diameter of the second bore.

* * * * *